(12) United States Patent
Baggio et al.

(10) Patent No.: US 9,668,055 B2
(45) Date of Patent: May 30, 2017

(54) PORTABLE RECORDER

(71) Applicant: SOWHAT STUDIO DI MICHELE BAGGIO, Roveredo in Piano (PN) (IT)

(72) Inventors: Michele Baggio, Roveredo in Piano (PN) (IT); Dino Baggio, Roveredo in Piano (PN) (IT)

(73) Assignee: SOWHAT STUDIO DI MICHELE BAGGIO, Roveredo In Piano (PN) (IT)

( * ) Notice: Subject to any disclaimer, the term of this patent is extended or adjusted under 35 U.S.C. 154(b) by 65 days.

(21) Appl. No.: 14/637,509

(22) Filed: Mar. 4, 2015

(65) Prior Publication Data

US 2016/0261955 A1    Sep. 8, 2016

(51) Int. Cl.

| H04R 5/00 | (2006.01) |
|---|---|
| H04R 5/027 | (2006.01) |
| H04R 1/40 | (2006.01) |
| G11B 20/10 | (2006.01) |
| H04R 3/00 | (2006.01) |
| H04R 21/02 | (2006.01) |

(52) U.S. Cl.
CPC ....... *H04R 5/027* (2013.01); *G11B 20/10527* (2013.01); *H04R 1/406* (2013.01); *H04R 3/005* (2013.01); *G11B 2020/10546* (2013.01); *G11B 2020/10601* (2013.01); *H04R 2201/003* (2013.01); *H04R 2201/401* (2013.01)

(58) Field of Classification Search
CPC .. H04R 5/027; H04R 3/005; H04R 2201/003; G11B 20/10527; G11B 2020/10546; G11B 2020/10601

USPC ................. 381/26, 92, 122, 58, 56
See application file for complete search history.

(56) References Cited

U.S. PATENT DOCUMENTS

| 2007/0057602 | A1* | 3/2007 | Song ................... | H04R 31/006 310/328 |
|---|---|---|---|---|
| 2011/0019836 | A1* | 1/2011 | Ishibashi .............. | H04R 1/406 381/92 |
| 2012/0224456 | A1* | 9/2012 | Visser .................. | G01S 3/8006 367/127 |
| 2015/0277847 | A1* | 10/2015 | Yliaho .................... | G06F 3/16 381/122 |

(Continued)

*Primary Examiner* — Vivian Chin
*Assistant Examiner* — Ammar Hamid
(74) *Attorney, Agent, or Firm* — King & Schickli, PLLC

(57) ABSTRACT

The portable sound recorder (1) according to the invention comprises A) a plurality of microphones (1A-F) arranged for picking up voices or sounds from an external environment; B) a protective outer shell (10) that encloses: B.1) a logic unit (2) programmed or in any case arranged for processing the electrical or opto-electronic signals emitted by the plurality of microphones improving the quality of the sounds recorded; B.2) a mass memory (4) arranged for memorising and store/conserve the sounds picked up by the plurality of microphones; B.3) an electric power supply (6) that supplies the logic unit and the mass memory; and where the plurality of microphones comprises at least three microphones of the Micro-ElectroMechanical System (MEMS) type. The recorder is suitable for semi-professional use, is very small in size, can very faithfully reproduce atmosphere and directionality effects, is suitable for example for making cinematographic recordings or recordings of natural phenomena, live concerts or other music or sports events and press conferences.

14 Claims, 8 Drawing Sheets

(56) References Cited

U.S. PATENT DOCUMENTS

2016/0044410 A1* 2/2016 Makinen ............... H04R 1/406
                                                                           381/26

* cited by examiner

PORTABLE RECORDER

FIELD OF THE INVENTION

The present invention relates to a portable sound recorder particularly suitable for being miniaturised whilst still providing semi-professional or professional performances.

STATE OF THE ART

The detection and recording of acoustic signals is currently carried out through different techniques depending on the field of use.

In the professional sector the recording of acoustic signals is often carried out at the same time as images are recorded by a television camera, generally far from the source of the signal. Whereas with a television camera it is possible to effectively shoot a subject that is far away or in motion through variable focus lenses, it is more difficult to record sounds coming from far-away sources.

Indeed, directional microphones arranged on a television camera or held in the hand close to it to avoid them being in shot do not offer the same quality as a recording carried out close to the acoustic source. In recordings of far away sources there is also a decay of the acoustic signal recorded overall due to the noise of the surrounding environment.

In order to solve such problems in the professional field microphones are used arranged close to the source that directly pick up and record the acoustic signal in loco or, after having suitably converted it into an electric signal, transmit it via radio to a central recorder or to the television camera. These systems do, however, take a considerable amount of time to be configured, and their configuration procedures that are per se complex.

Therefore, in the case of an occasional and extemporaneous event it becomes difficult if not impossible to continuously and safely pick up and record an acoustic signal with a short or substantially zero warning. In journalism this condition often results in important moments of documentation being lost in real time.

In the field of consumer goods different microphones and audio signal recorders are available, but providing the medium-low quality typical of voice recorders that have a frequency range limited to the most significant components of the human voice and indicatively comprised between 300-5000 hz, and is not therefore suitable for use extended to the whole range of audible frequencies, like for example recording in the field of cinematography.

All of the aforementioned microphones and recorders for the general consumer are also of dimensions such as to make them difficult to hide. For this reason in general an external microphone is used connected to a recorder or to a signal transmitter, the latter being kept in a hidden position.

Finally, in the field in general of security and for concealed eavesdropping specific miniaturised recorders have been made; however, since on the one hand they must allow eavesdropping and recording for long time periods, and on the other hand their miniaturisation does not allow them to be equipped with either sufficiently large batteries, or with a plurality of microphones and in general with complex and therefore bulky electronic circuits, a serious limitation of this type of device is an inevitable worsening of the quality of the audio signal detected and recorded.

A purpose of the present invention avoiding the aforementioned drawbacks, providing in particular a miniaturised sound recorder capable of providing a substantially better recording quality than that of current recorders for the general consumer, at lower production costs than professional recorders and recording systems.

SUMMARY OF THE INVENTION

Such a purpose is achieved, according to the present invention, with a portable recorder having the characteristics according to claim 1.

Further features of the device are the object of the dependent claims.

The advantages that can be obtained with the present invention will become clearer, to those skilled in the art, from the following detailed description of some particular non-limiting embodiments, described with reference to the following schematic figures.

LIST OF FIGURES

DETAILED DESCRIPTION

Figure 1:
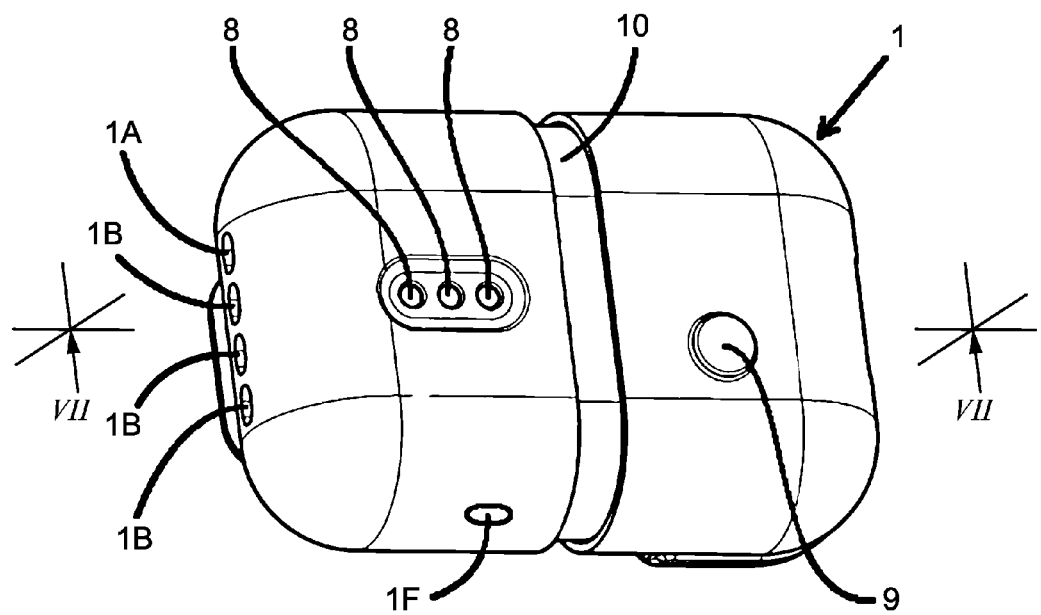
FIG. 1 shows a perspective view, from the side of the larger front face, of a recorder according to a first particular embodiment of the invention.
Figure 2:
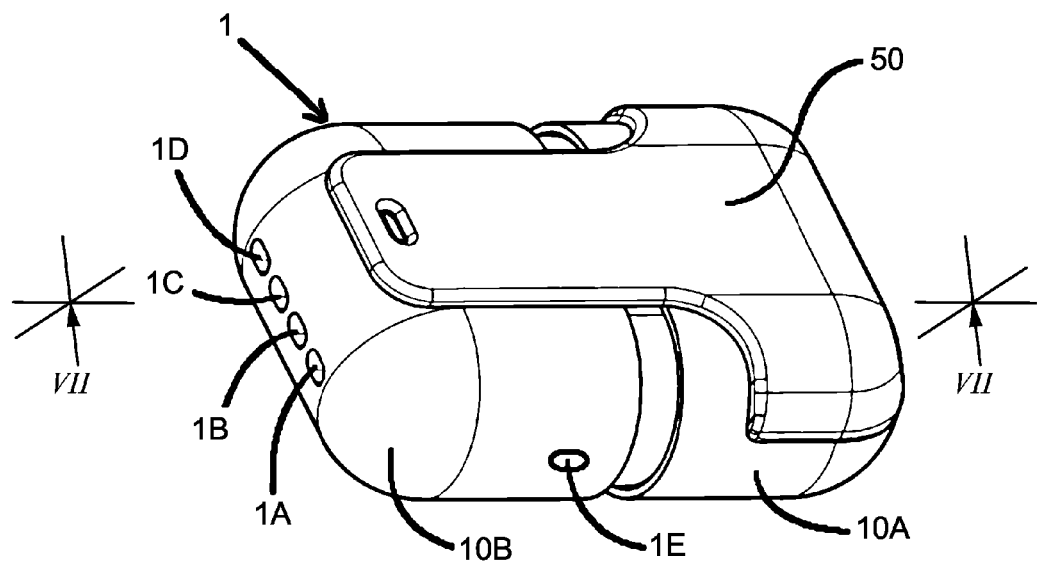
FIG. 2 shows a perspective view, from the side of the larger rear face, of the recorder of FIG. 1.

By "stereophonic recording" in the present description a set is meant, made up of not only two, but also more simultaneous monophonic recordings.

Therefore, in the present description a recording currently called of the "surround sound" type is considered as a particular type of stereophonic recording.

Figure 9:
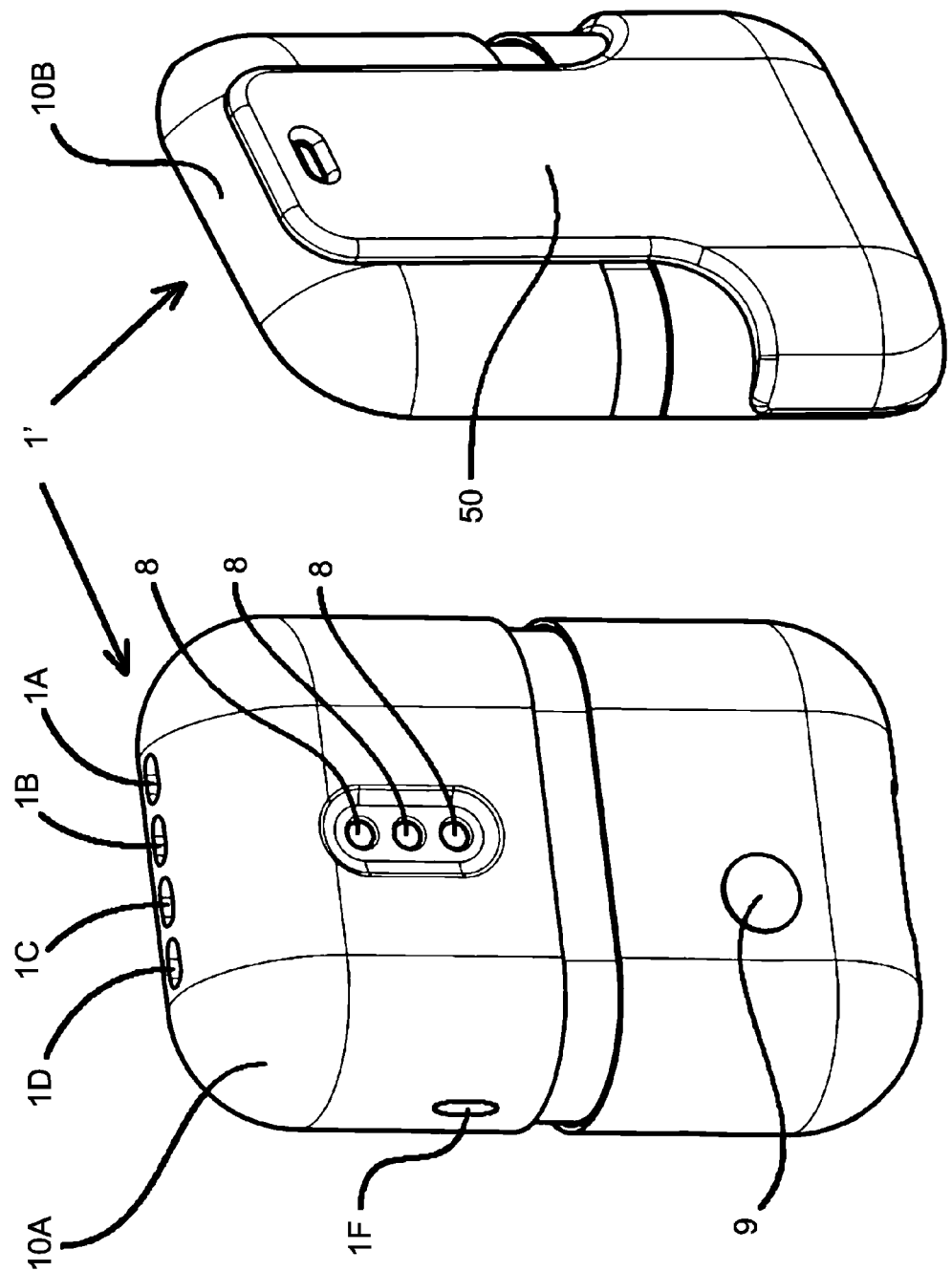
FIG. 9 shows a perspective view of the two open half-shells of the protective outer shell of the recorder according to a third particular embodiment of the invention.

FIGS. 1-6 relate to a portable sound recorder according to a first particular embodiment of the invention, referred to with the overall reference 1 and, according to an aspect of the invention, comprising:

- a plurality of microphones 1A-1D, 1E, 1F arranged for picking up voices or sounds from an external environment;
- a protective outer shell 10, preferably made from substantially rigid or semi-rigid plastic material, like for example ABS or a mixture of ABS and polycarbonate, which in turn encloses:
- a first logic unit 2, also called "digital signal processor", programmed or in any case arranged for processing the electrical or opto-electronic signals emitted by the plurality of microphones improving the quality of the sounds recorded;

a mass memory 4 arranged for memorising and storing the sounds picked up by the plurality of microphones;

an electric power supply 6, such as for example a battery or a transformer, which powers the logic unit and the mass memory;

wherein the plurality of microphones 1A-1D comprises at least three, and preferably at least four microphones of the Micro-ElectroMechanical System (MEMS) type. The acronym MEMS currently indicates a class of electromechanical components of various types, of variable dimensions indicatively between 1 micron and a few millimetres and made with elements made of silicon and techniques typical of the production of microelectronic semi-conductor components, for example electrodeposition, photolithography, dry etching and wet etching. The protective outer shell 10 preferably has a substantially squashed shape with rounded edges and corners, for example edges forming semi-circular cross sections, as exemplified in FIGS. 1, 2, 9, 7. The protective outer shell 10 preferably has an overall parallelepiped shape, again as exemplified in FIGS. 1, 2, 9, allowing good exploitation and filling of its internal space and thus contributing to allowing the miniaturisation of the device.

Figure 5:
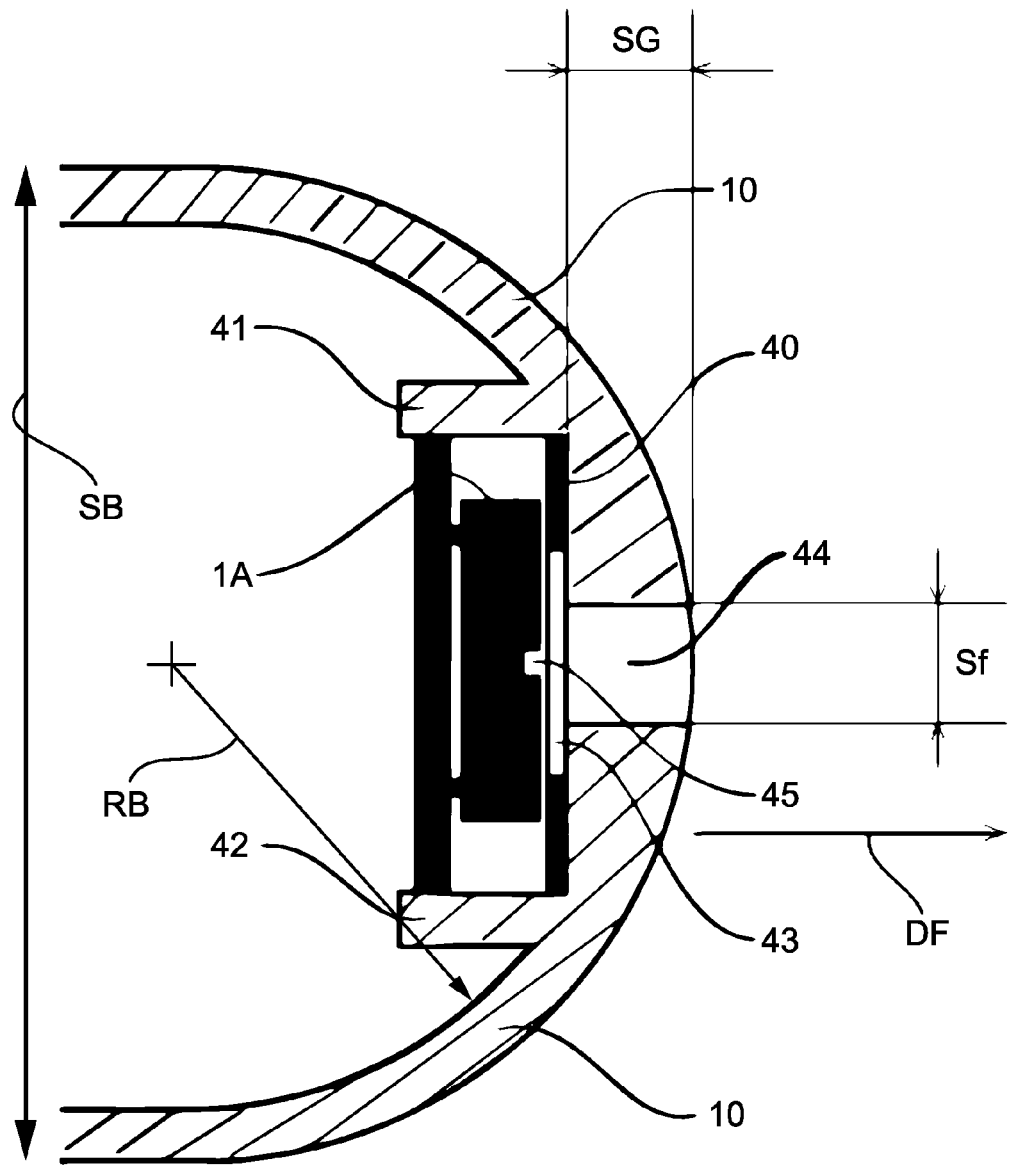
FIG. 5 shows a side view of the cross section of an edge of the recorder of FIG. 1.

Advantageously, the perimeter edges of the protective outer shell 10 have substantially semi-circular cross sections, as shown for example in FIG. 5. More generally, preferably the cross sections of the perimeter edges of the shell 10 have average bending radii comprised between 0.2-0.7 times the average external thickness SB of the shell itself, and for example comprised between 5-10 mm. Such considerably rounded shapes of the perimeter edges of the shell 10 facilitate the sliding of clothes on the microphone itself, allow the space inside the shell itself to be best exploited, allowing for example smaller electronic components such as for example the microphones 1A-1H to be housed at the centre of the rounded portions of the edges, whilst at the same time allowing a thickened part of the wall of the shell to be made in the central area of the curved edges. If the shell 10 is divided into two half-shells 10A, 10B by a dividing plane that crosses such a thickened part—for example a middle plane parallel to the larger faces of the recorder 1 (FIG. 9)—, such a thickened part facilitates the subsequent welding or gluing of the two half-shells: indeed, the thickness onto which the glue is to be deposited is greater.

Figure 3:
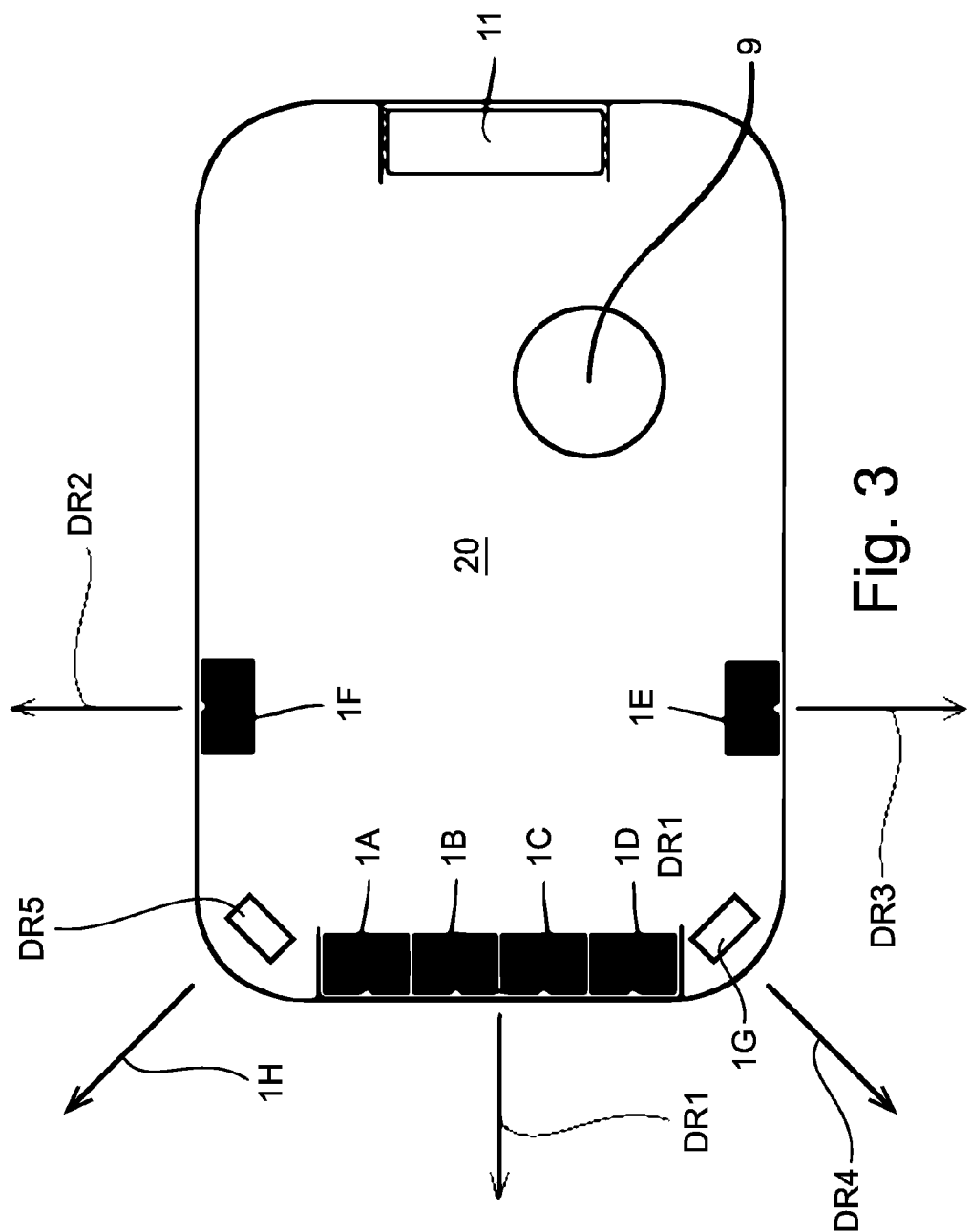
FIG. 3 shows a front view with a first scheme of the microphones of the recorder of FIG. 1.
Figure 4:
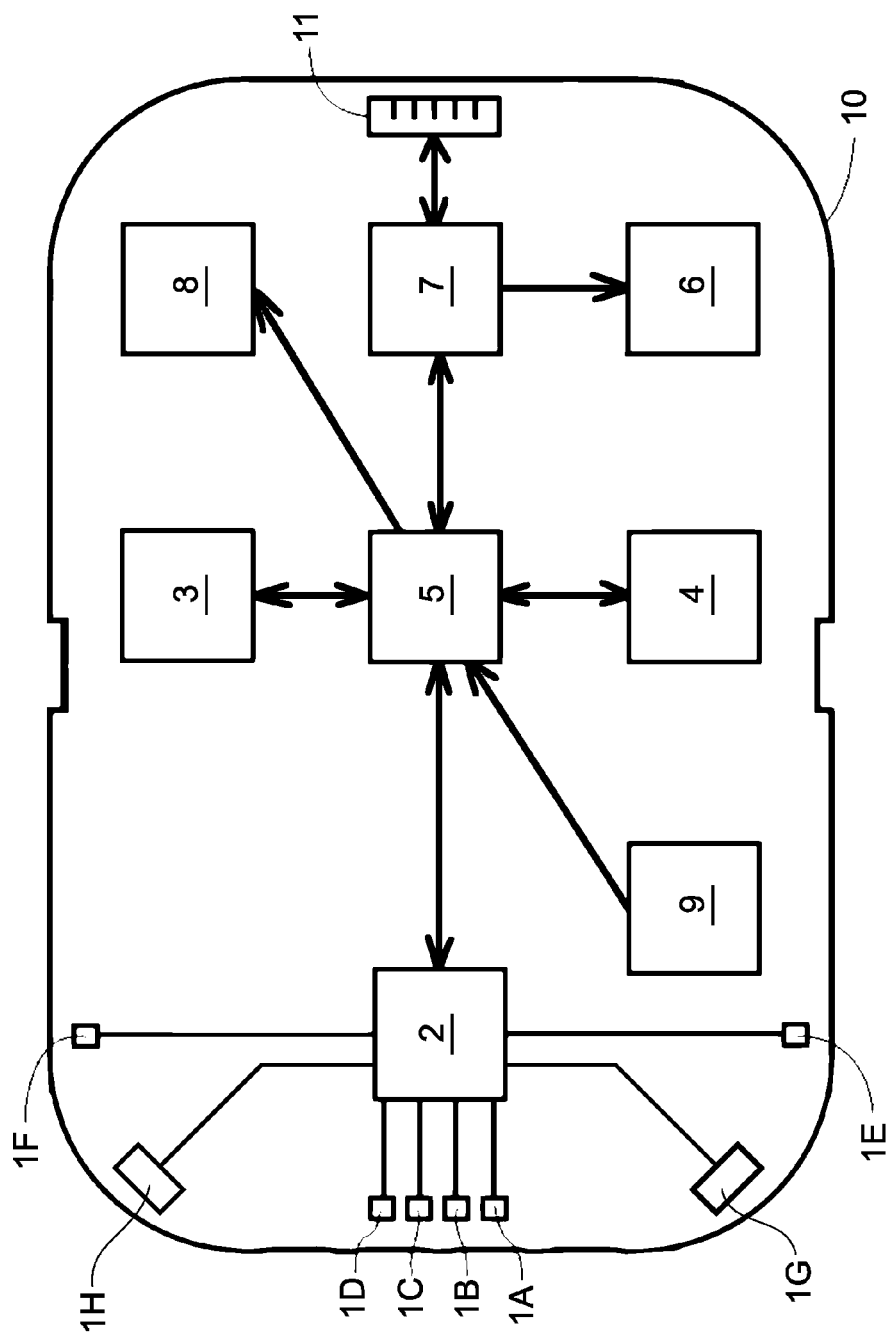
FIG. 4 shows a front view with a second scheme of the microphones and of other electrical or electronic components of the recorder of FIG. 1.

Advantageously, at least three, and preferably at least four microphones 1A-1D, conventionally indicated in the present description as "front microphones", are aligned so as to form a row, preferably a straight row. Advantageously at least three, and preferably at least four microphones 1A-1D are oriented, i.e. directed, in the same direction DR1 (FIG. 3).

In the present description the orientation of an MEMS microphone refers to one or more of the following criteria:

the direction perpendicular to the surfaces in which the various layers that form the MEMS mainly lie;

the direction of maximum pick-up sensitivity of the microphone.

Advantageously, the recorder 1 also comprises one or more side microphones 1F, 1D, also of the MEMS type, oriented in one or more directions DR2, DR3 transversal, and preferably perpendicular, to the first direction DR1. Advantageously, at least one first side microphone 1G faces in a third direction DR3 opposite the direction DR2 in which at least one second side microphone 1F faces, and such a direction DR2 is preferably perpendicular to the direction DR1.

The recorder 1 can also be equipped with one or more oblique microphones 1G, 1H respectively oriented in a direction DR4, DR5 inclined by about ±30-60°, more preferably by about ±40-50° and for example by about ±43-47° with respect to the direction DR1 according to which the front microphones 1A-1D are oriented. Preferably, the oblique microphones 1G, 1H are present in an even number on the recorder 1 and are arranged and oriented symmetrically with respect to the direction DR1 according to which the front microphones 1A-1D are oriented. Preferably, the oblique microphones 1G, 1H are used to reproduce the so-called "pan" effect.

The directions DR2, DR3, DR4, DR5 in which the side microphones 1E, 1F and oblique microphones 1G, 1H are oriented are preferably divergent with respect to the first direction DR1 in which the front microphones 1A-1D are oriented (FIG. 3).

The microphones 1A-1F are preferably of the MP34DT01 type produced by ST MICROELECTRONICS.

Figure 6:
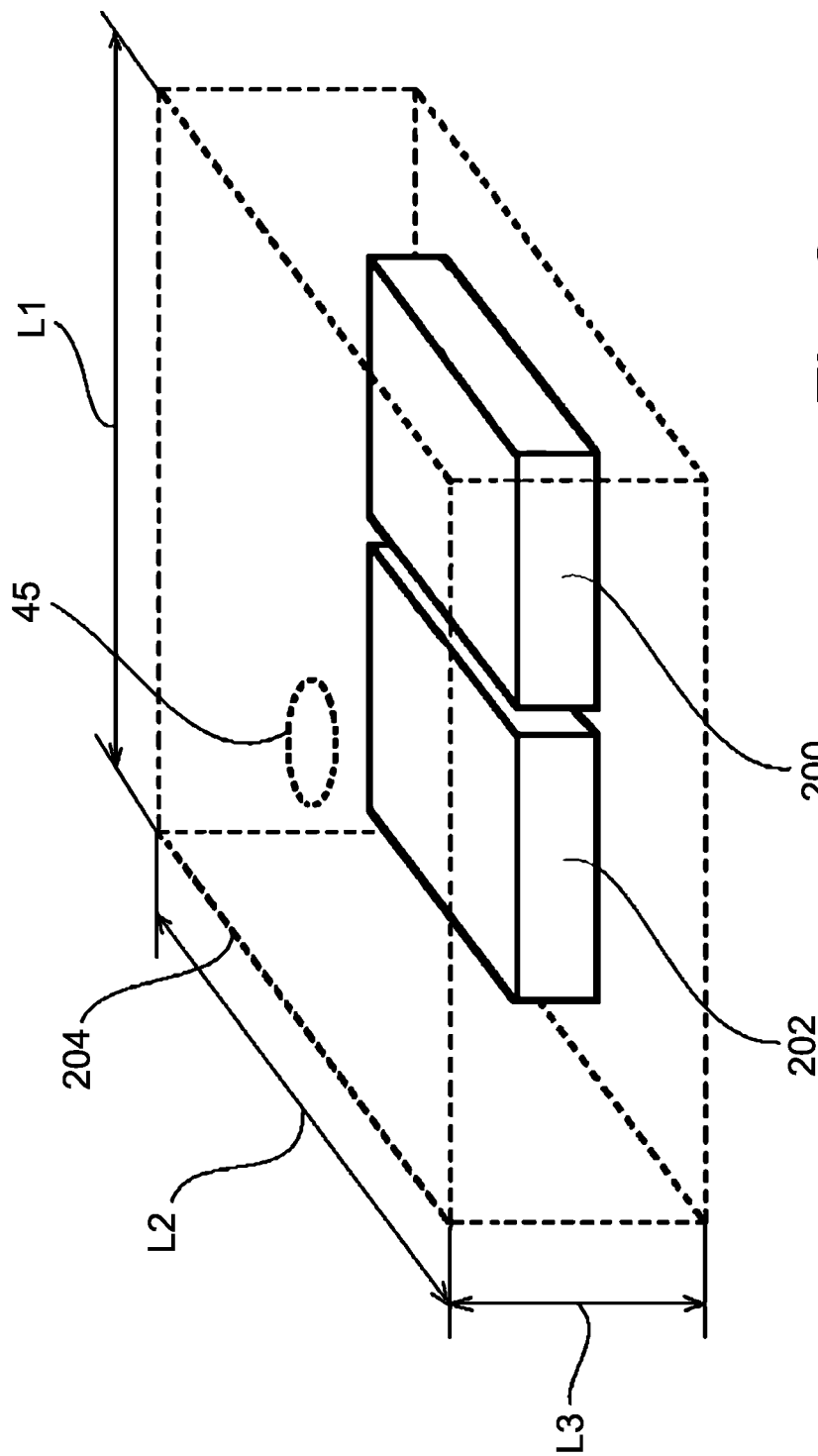
FIG. 6 shows a perspective view of an MEMS microphone of the recorder of FIG. 1.
Figure 7:
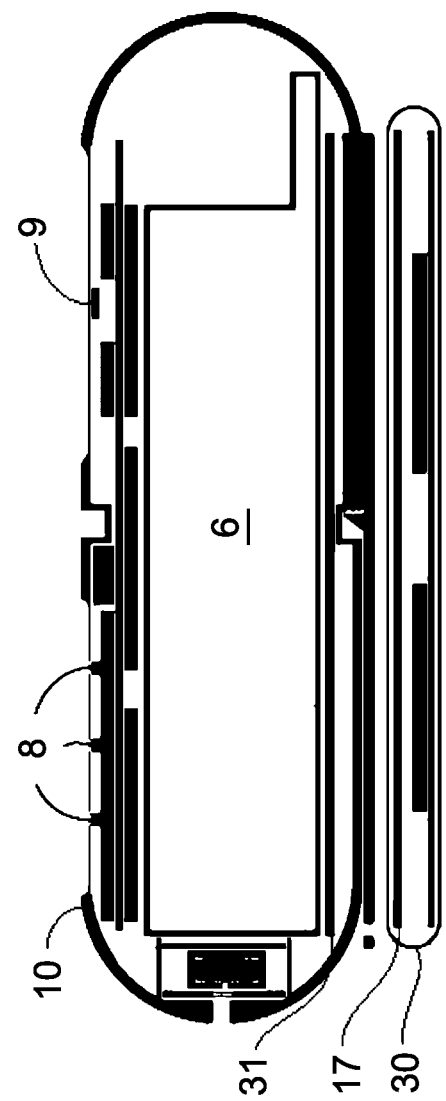
FIG. 7 shows a section view, according to the plane VII-VII, of a recorder according to a second particular embodiment of the invention.

Each microphone 1A-1F preferably comprises:

an acoustic sensor 200, in turn comprising a condenser the capacity of which is varied by the sound waves that hit it;

an integrated conversion circuit 202, that converts the variations in capacity of the sensor into suitable analogue or, advantageously, digital signals; the fact that the circuit 202 directly emits a digital output contributes to reducing the number of internal components of the recorder 1 and therefore its overall dimensions;

a casing 204 that encloses the acoustic sensor 200 and the conversion circuit 202 and forms a hole 45 through which the sound waves reach the sensor 200 (FIGS. 5, 6).

MEMS technology allows microphones of microscopic or almost microscopic dimensions to be made at very low cost, and the casing 204 can for example have a total length L1 of about 4, a width L2 of 3 mm and a depth L3 of about 1 mm; this considerably contributes to the miniaturisation of the recorder 1. On the other hand, current MEMS microphones are not generally of a quality such as to make them suitable, if used individually, for professional uses like for example recording a press conference for a radio or television channel, amplifying an actor's voice in a theatrical show, or recording and broadcasting a jazz or classical music concert.

The aforementioned arrangement in a row, i.e. array, of the microphones 1A-1D allows the quality of the recording to be considerably improved, considerably increasing the Signal To Noise Ratio (SNR) by "summing", or in any case processing, the recordings of the at least three or four microphones 1A-1F to obtain a single cleaned and improved monophonic recording.

For this purpose, the recordings of the microphones 1A-1D, and possibly also 1E and 1F can be treated for example with algorithms or in any case processes that are per se known, like for example a simple moment-by-moment average of the recordings of the microphones 1A-1D.

It has been found that three, and preferably four MEMS microphones are sufficient to provide a sufficient increase in the SNR ratio for many of the most frequent professional purposes, and four front microphones 1A-1D is an optimal compromise between quality of the sound obtained and miniaturisation of the recorder 1. Clearly, a greater number of microphones allows the noise to be eliminated even further.

Preferably, the microphones 1A-1F are omnidirectional, as MEMS microphones often are, at least at medium-low frequencies.

If their output recordings are simply summed, the recorder 1 as a whole also has omnidirectional reception sensitivity.

By having at least four front microphones it is possible to make their assembly directional overall, for example with per se known techniques like the following:

M.1) to the signals simultaneously coming out from three microphones 1A-1C, which are summed in phase, summing in antiphase—i.e. out of phase by 180°—the signal of a fourth front microphone 1D, obtaining a monophonic signal; in this operating mode the directionality diagram of the recorder 1 as a whole becomes similar to a cardioid, the SNR lowers but by a little, the recorder becomes moderately directional, emphasises the sound source that is located in front of the front microphones 1A-1D thus being suitable for example for recording sound sources like a subjected being interviewed or moving outdoors, or a musical ensemble.

M.2) to the signal simultaneously coming out from two microphones 1B, 1C which are summed in phase, summing in antiphase—i.e. out of phase by 180°—the signal of two front microphones 1A and 1D, obtaining a monophonic signal; in this operating mode the directionality diagram of the recorder 1 as a whole becomes similar to a hypercardioid, the SNR ratio lowers further with respect to mode M.1), the recorder becomes more directional with respect to case M.1) and suitable for example for relatively extreme conditions like for example to record a subject in a very noisy setting or isolate it for intelligibility or artistic requirements; for example, during a motorcycling or formula 1 race for logistical or safety requirements the microphone must stay far away from the driver being interviewed.

The use of at least two side microphones 1E, 1F allows a stereophonic signal to be reproduced with reduced noise and acoustic background effects or more generally environment effects, for example of the M/S (Mid Side) or surround type as follows:

M.3) obtaining a first processed monophonic signal by summing in phase the outputs of all of the front microphones, for example of the four 1A-1D; obtaining a second processed monophonic signal by summing the output of the side microphone 1E with the antiphase output—i.e. out of phase by 180°—of the microphone 1F; the two monophonic signals create a stereophonic signal suitable for example for the fields of cinematography, documentaries or music;

M.4) obtaining a stereophonic signal from the following five monophonic channels processed:
- a first processed monophonic signal by summing in phase the simultaneous outputs of all of the front microphones, for example of 1B and 1C;
- a second processed monophonic signal from a further MEMS microphone 1H oriented at +45° with respect to the direction DR1 of the front microphones;
- a third processed monophonic signal from a further MEMS microphone 1G oriented at −45° with respect to the direction DR1 of the front microphones;
- a fourth processed monophonic signal coming from a first side microphone 1E and in phase with that of the microphones 1C, 1D;
- a fifth processed monophonic signal coming from a second side microphone 1F and out of phase by 180° with respect to that of the microphones 1C, 1D;

It is thus possible to obtain the so-called five audio signals Front Left, Center, Front Right, Left Surround and Right Surround that in postproduction can be encoded on a Dolby® or DTS® matrix as desired.

This stereophonic signal is particularly suitable for recording for example documentaries or videos at low production costs, or musical performances in which it is wished to reproduce the atmosphere of the performance, or to study natural events, by carrying out in particular the tracking of the movements of the subject studied, offering a particularly convincing surround sound effect.

The usefulness of having side microphones is linked to the fact that MEMS microphones are substantially omnidirectional at medium-low frequencies, but directional at medium-high frequencies, and the ambience and directionality effects of the sound are given to a great extent by medium-high frequencies.

Preferably, the shell 10 contains the front microphones 1A-1D and side microphones 1E, 1F.

Figure 8:
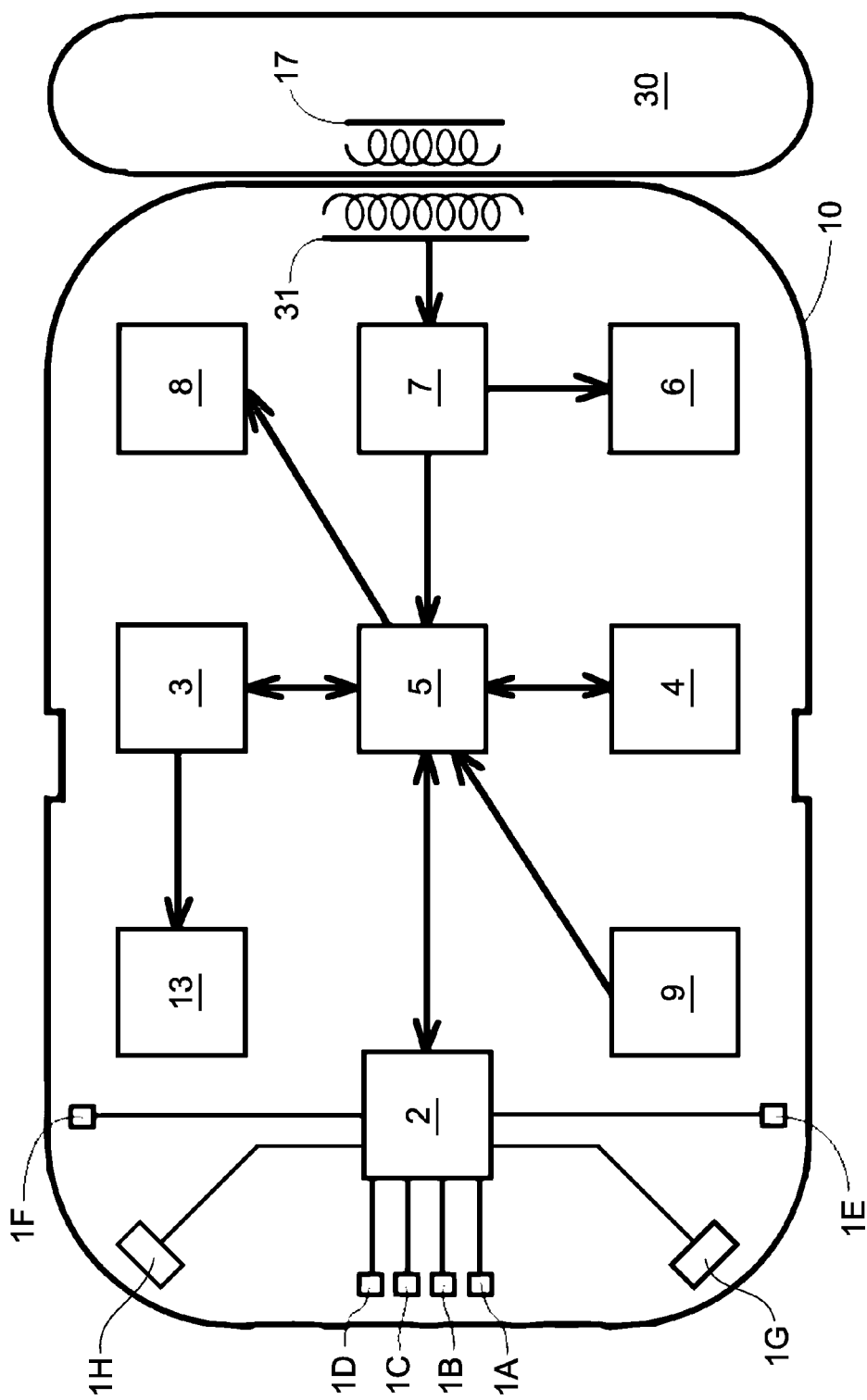
FIG. 8 shows a front view with a scheme of the microphones and of other electrical or electronic components of the recorder of FIG. 7.

The shell 10 can also contain one or more of the following devices:
- a BLUE TOOTH device with low energy consumption 3;
- a battery-charger and voltage regulator device 7, powered for example by an external electrical energy distribution network and that recharges the battery 6;
- a plurality of luminous indicator devices, preferably LED bulbs 8;
- an activation element of said microphone, preferably a button 9;
- a second logic unit 5, called control unit, which manages, coordinates and controls the other components of the recorder 1, for example the digital signal processor 2, the mass memory 4 and the electric power supply 6;
- a WiFi module to communicate with external units, like for example a personal computer, a smartphone, a video camera, a professional recorder or a recording console; in order to be able to transmit in real time recordings with a sufficient fidelity, the WiFi module is preferably capable of reaching a transmission speed equal to or greater than 10 Mbits/second, and more preferably equal to or greater than 24 MBits/second;
- a wireless electric power supply to charge the battery 6, for example through currents induced by an external coil 17 (FIGS. 7, 8); outside the shell 10 of the recorder 1 it is possible for example to arrange a plate 30 equipped with an internal coil 17 which supplies the battery 6 or more generally the various internal components of the recorder 1; correspondingly, inside the shell 10 there is a second power coil 31 suitable for receiving the inductive signal of the coil 17, preferably at high frequency and high power.

The wireless power supply system allows the seal of the shell 10 to be made even more fluid tight; eliminating the galvanic contacts considerably contributes to avoiding damages to the electronics; it allows the simultaneous charging of several recorders and it makes cables, connectors and specific adapters no longer necessary. Clearly, alternatively, the recorder 1 can be provided with a system for charging through male plug and female socket connection with galvanic contacts, like for example the microUSB port 11 of FIG. 4.

Advantageously, in order to contribute to the reduction of the dimensions of the recorder 1, each microphone 1A-1F is of the MEMS type provided with a box-like casing 204 having:
- a length L1 preferably equal to or less than 8 mm, and more preferably equal to or less than 5-7 mm; and/or
- a width L2 preferably equal to or less than 6 mm, and more preferably equal to or less than 4-5 mm; and/or
- a depth L3 equal to or less than 3 mm and more preferably equal to or less than 1-2 mm.

Advantageously, in front of the MEMS microphones 1A-1F there are one or more openings 44 made in the shell 10, so as to improve the reception of the sound waves by the MEMS 1A-1F (FIGS. 1, 2, 5, 9).

Preferably, the front microphones 1A-1D are arranged in a row as close together as possible, so that for example the whole array of four MEMS is no longer than 13-15 mm. In this way the whole array of front microphones, and more generally all of the microphones of the recorder are arranged a much shorter distance apart one from another than the minimum distance necessary for detecting a delay between sounds perceptible to the human ear, greatly simplifying the treatment to which it is necessary to subject the signals coming out from the single microphones to obtain a monophonic signal that is cleaner or in any case devoid of ambience effects.

More generally, preferably the front microphones 1A-1D and the side ones 1E, 1F are a maximum distance apart one from another equal to or less than 3.5 centimetres, and more preferably equal to or less than 2.5-3 centimetres.

In order to protect the recorder 1 from water, humidity, dirt and other harmful agents, advantageously the openings 44 are closed by a membrane 43 of a suitable watertight material that is easy for sound to pass through; such a material is preferably a non-woven fabric formed from threads of foamed polytetrafluoroethylene, per se known and produced for example by the company W. L. Gore & Associates (USA). Each membrane 43 can be fixed to the shell 10 and held in precise position with respect to it for example by gluing its external parts 40 close to the relative opening 44 (FIG. 5).

Alternatively and/or in combination with gluing, inside the outer casing 10 there can be centring ribs or projections 41, 42 that define a seat in which to insert the respective membrane 43; the projections 41, 42 are sized, with respect to the dimensions of the respective membrane 43, so as to facilitate and maintain its correct positioning in front of the openings 44.

Possibly a single bag of the aforementioned impermeable membrane, enclosed in the outer shell 10, as well as the microphones 1A-1H, both front, side, oblique and possible others, can enclose part or all of the electrical and electronic components of the recorder 1.

As a further alternative, the openings 44 are closed by a diaphragm integral with the rest of the shell 10, and that for example forms a simple narrowed portion thereof. In order to allow good reception of the sounds by the microphones 1A-1F such a diaphragm can have a thickness for example comprised between 0.1-0.3 mm, and preferably roughly equal to 0.2 mm.

In order to improve the reception of sound waves by the MEMS microphones and widen the reception band thereof, advantageously:
  each of them faces onto an opening 44 the front surface of which—i.e. considered in a plane of projection perpendicular to the direction DF in which the MEMS microphone is oriented—is equal to or greater than three times the area of the hole 45 of the MEMS in question; and/or
  the thickness SG of the shell 10 at each opening 44 is equal to or less than the equivalent diameter Deq of the opening, wherein $$\text{Equivalent diameter} = (\text{area of the front surface of the opening}*4/\pi)^{0.5}$$

Such dimensional arrangements of the openings 45 allow each MEMS microphone 1A-1F to receive, with little noise, sounds with fundamental frequencies ranging between 80-18000 hz.

Thanks to the above teachings it has been possible to make a recorder 1 for semi-professional, or prosumer, use, of very small dimensions, indicatively of 13×26×39 mm suitable for making for example recordings in cinematography—for example positioning several microphones within the shooting set—or professional recordings for the documentation of natural phenomena, live concerts or other music or sports events, press conferences, scholastic teaching and study, investigative journalism—recording of events concerning reporting—or blogging. As well as a very faithful reproduction of ambience and directionality effects, the wide range of recording frequencies of the recorder 1 extends the applications thereof well beyond simple recording of human voices in not particularly critical positions, allowing it to record a very wide variety of sound sources.

The arrangement in an array makes it possible to use MEMS microphones and other electronic components of very small dimensions and relatively low cost, allowing the total cost of the recorder to be brought to the level practically of a mass consumer product whilst still obtaining a professional or semi-professional recording quality. Thanks to having such small dimensions, the recorder 1 can be easily fixed onto the subject whose voice or musical performance it is wished to record, for example to clothing with a possible clip 50 (FIGS. 2, 9), or mounted on model aircraft or on drones that can even be very small. Concerning this, the shell 10 has a total external bulk preferably equal to or less than about 30 cubic centimetres, more preferably equal to or less than 20-25 cubic centimetres and even more preferably equal to or less than 12-14 cubic centimetres. Preferably, the external bulks of the shell 10 observe one or more of the following conditions, and have:
  a length equal to or less than five centimetres;
  a length equal to or less than four centimetres;
  a width equal to or less than three centimetres;
  a thickness equal to or less than two centimetres;
  a thickness equal to or less than 1.5 centimetres.

Since it is extremely close to the sound source to be recorded, the recorder 1 is able to immediately provide a much cleaner recording devoid of undesired disturbances and noise with respect for example to the bulky current directional microphones for professional use.

The small dimensions of the microphones and of the other electronic internal components allow a major part of the volume inside the recorder 1 to be made available for the batteries 6; the batteries 6 can thus ensure a great autonomy and render a wired power supply unnecessary during recording: this aspect also contributes to allowing a faster set up before a recording session, as well as making the recorder 1 substantially invisible during possible filming.

Regarding this, the batteries 6 observe one or more of the following conditions, and have:
  a total volume comprised between 4-13 cubic centimetres, and more preferably comprised between 4-6 cubic centimetres;
  a length comprised between 3-4 centimetres;
  a width comprised between 2-2.5 centimetres;
  a thickness comprised between 0.5-1.5 centimetres.

The remote signal connections described above, for example WiFi® and Bluetooth®, allow the recorder 1 to be quickly programmed and adjusted remotely through a notebook, PC or smartphone even if it is already fixed onto the subject to be recorded, thus saving precious time in improvised or urgent situations; moreover, it can transmit the recording live to a more complex and refined (even if bulky) recording device, like for example a personal computer, a digital professional recorder or a video camera.

The embodiments described above can undergo different modifications and variations without departing from the scope of protection of the present invention. Moreover, all of the details can be replaced by technically equivalent elements. For example, the materials used, as well as the sizes, can be whatever according to the technical requirements. It should be understood that an expression of the type "A comprises B, C, D" or "A is formed from B, C, D" comprises and describes also the particular case in which "A consists of B, C, D". The examples and lists of possible variants of the present application should be taken as non-exhaustive lists.

The invention claimed is:

1. A Portable sound recorder, comprising: a plurality of microphones arranged for picking up voices or sounds from an external environment; a protective outer shell enclosing: a logic unit programmed or configured for processing the electrical or opto-electronic signals emitted by the plurality of microphones improving the quality of the voices or sounds recorded; a mass memory arranged for memorizing and storing and/or conserve the voices or sounds picked up by the plurality of microphones; and an electric power supply powering the logic unit and the mass memory; wherein: the plurality of microphones comprises at least three microphones of the Micro-ElectroMechanical System (MEMS) type; the plurality of MEMS microphones are aligned so as to form a row of at least three or four microphones; the protective outer shell encloses at least three MEMS microphones; and the plurality of MEMS microphones are arranged at a maximum distance, any one from any other, equal to or less than 3.5 centimeters.

2. The portable sound recorder according to claim 1, wherein the plurality of microphones are front microphones and belong to the row of at least three microphones are oriented in a first direction, and the recorder also comprises one or more side microphones oriented in one or more directions transversal to the first direction.

3. The portable sound recorder according to claim 1, wherein each MEMS microphone comprises:
   an acoustic sensor arranged for converting a sound wave into a first analogue electric signal;
   a conversion circuit arranged for converting the first analogue electric signal into a second digital electric signal or into a second analogue electric signal; and
   a casing enclosing the acoustic sensor and the conversion circuit and provided with a hole through which the sound waves reach the sensor.

4. The portable sound recorder according to claim 1, wherein the protective outer shell has a total external bulk equal to or less than 30 cubic centimeters.

5. The portable sound recorder according to claim 1, wherein the protective outer shell has one or more of the following total external bulks: a length equal to or less than five centimeters; a length equal to or less than four centimeters; a width equal to or less than three centimeters; a thickness equal to or less than two centimeters or a thickness equal to or less than 1.5 centimeters.

6. The portable sound recorder according to claim 1, wherein in the protective outer shell a plurality of openings is formed, each of which has a front surface equal to or greater than three times the area of the hole of each microphone that faces such an opening.

7. The portable sound recorder according to claim 1, wherein the wall thickness of the protective outer shell at each opening is equal to or less than an equivalent diameter of such an opening.

8. The portable sound recorder according to claim 1, wherein the microphones referred to as front microphones and belonging to the row of at least three microphones are oriented in a first direction, and the recorder also comprises one or more oblique microphones oriented in one or more directions oblique to the first direction.

9. The portable sound recorder according to claim 1, programmed or arranged for summing the output signals of at least three front microphones so as to obtain a processed monophonic signal from them having a higher signal to noise ratio with respect to the signal to noise ratios of each of the output signals of the at least three front microphones.

10. The portable sound recorder according to claim 1, programmed or arranged for carrying out the following operation: summing the output signals of at least one further front microphone in antiphase to the sum of the output signals of at least three front microphones.

11. The portable sound recorder according to claim 1, programmed or arranged for carrying out the following operations: summing the output signals of at least two further front microphones in antiphase to the sum of the output signals of at least two front microphones.

12. The portable sound recorder according to claim 2, programmed or arranged for carrying out the following operations:
   summing the output signals of at least three and preferably at least four front microphones obtaining from them a first processed monophonic signal;
   summing the output signal of at least one second side microphone in antiphase to the output signal of at least one first side microphone obtaining a second processed monophonic signal; and
   associating the first and the second processed monophonic signal in a stereophonic signal.

13. The portable sound recorder according to claim 2, programmed or arranged for carrying out the following operations:
   summing the output signals of at least two front microphones obtaining a first processed monophonic signal from them;
   acquiring as second processed monophonic signal the output of a first side microphone;
   acquiring as third processed monophonic signal the output of a second side microphone oriented in an opposite direction with respect to the first side microphone;
   acquiring as fourth processed monophonic signal the output of a first oblique microphone having an orientation that is inclined both with respect to said at least two front microphones and to said side microphones;
   acquiring as fifth processed monophonic signal the output of a second oblique microphone oriented according to a direction substantially symmetrical, with respect to the direction of the front microphones, to the direction of orientation of the first oblique microphone; and
   associating the first, second, third, fourth and fifth processed monophonic signal in a stereophonic signal.

14. A portable sound recorder, comprising:
   a plurality of microphones arranged for picking up voices or sounds from an external environment;
   a protective outer shell enclosing:
   a logic unit configured for processing the electrical or opto-electronic signals emitted by the plurality of microphones improving the quality of the sounds recorded;
   a mass memory arranged for memorising and storing and/or conserve the sounds picked up by the plurality of microphones; and an electric power supply powering the logic unit and the mass memory;

wherein:

the plurality of microphones comprises at least three microphones of the Micro-ElectroMechanical System (MEMS) type;

wherein the microphones comprise a front row of at least three microphones oriented in a first direction, and the recorder further comprises one or more side microphones oriented in one or more directions transverse to the first direction;

wherein the logic unit is configured for carrying out the following operations:

summing the output signals of at least two front microphones obtaining a first processed monophonic signal;

acquiring as second processed monophonic signal the output of a first side microphone;

acquiring as third processed monophonic signal the output of a second side microphone oriented in an opposite direction with respect to the first side microphone;

acquiring as fourth processed monophonic signal the output of a first oblique microphone having an orientation that is inclined both with respect to said at least two front microphones and to said side microphones;

acquiring as fifth processed monophonic signal the output of a second oblique microphone oriented according to a direction substantially symmetrical, with respect to the direction of the front microphones, to the direction of orientation of the first oblique microphone; and associating the first, second, third, fourth and fifth processed monophonic signal in a stereophonic signal.

* * * * *